V. D. ROSS.
CONNECTING DEVICE FOR AUTOMOBILE TOPS.
APPLICATION FILED MAR. 21, 1922.
1,426,912.   Patented Aug. 22, 1922.
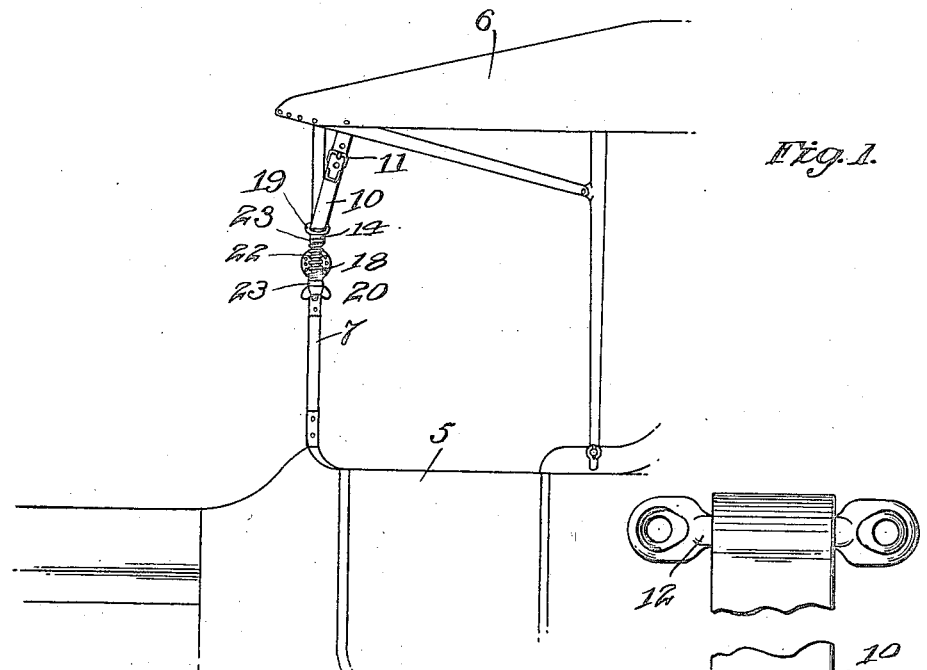
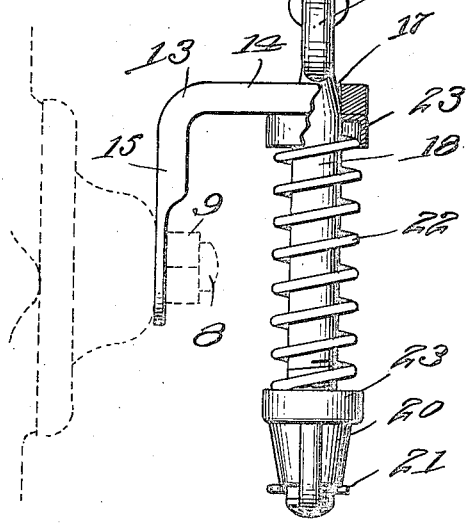
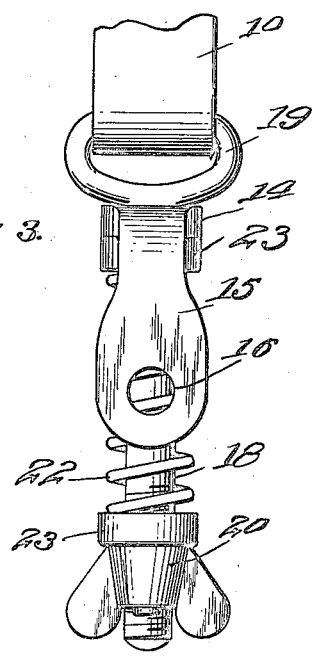
Virgil D. Ross.
Inventor
By Jerry A. Matthews
Attorney.

UNITED STATES PATENT OFFICE.

VIRGIL D. ROSS, OF ALBEMARLE, NORTH CAROLINA.

CONNECTING DEVICE FOR AUTOMOBILE TOPS.

1,426,912.   Specification of Letters Patent.   Patented Aug. 22, 1922.

Application filed March 21, 1922. Serial No. 545,573.

*To all whom it may concern:*

Be it known that I, VIRGIL D. ROSS, a citizen of the United States, residing at Albemarle, in the county of Stanly and State of North Carolina, have invented certain new and useful Improvements in Connecting Devices for Automobile Tops, of which the following is a specification.

My invention relates to improvements in devices for connecting the forward portion of the top of an automobile, with the wind shield post.

An important object of the invention is to provide a device of the above mentioned character, which is adjustable so that it may be properly applied to the connected parts, and which is adapted to exert a constant yielding pull upon the automobile top, permitting slight relative movements between the longitudinal edges of the top, and taking up shocks.

A further object of the invention is to provide a device of the above mentioned character, which is extremely simple in construction, and is adapted to be applied to the wind shield, pivot post element, or bolt, such as found upon a Ford automobile;

A further object of the invention is to provide a device of the above mentioned character which extends outwardly from the wind shield post, and in no way interferes with the use of the curtains.

Other objects and advantages of the invention will be apparent during the course of the following description.

In the accompanying drawing forming a part of this specification and in which like numerals are employed to designate like parts throughout the same, Fig. 1 is a side elevation of a device embodying my invention, showing the same applied to an automobile.

Fig. 2 is an elevation at right angles to Fig. 1, of the device, parts being broken away, and Fig. 3 is a side elevation of the device, from the inner side.

In the drawings, wherein for the purpose of illustration is shown a preferred embodiment of my invention, the numeral 5 designates the body of an automobile, 6 the top. The numeral 7 designates the wind shield post, formed in two sections, having a hinge joint, including a bolt 8, carrying a nut 9.

As is well known, upon the ordinary Ford automobile, there is a strap which is attached at its upper end to one of the bows of the top and has a bracket secured to its lower end, which bracket is apertured and is mounted upon the bolt 8. This strap is relatively non-extensible and is not elastic. There is always a certain amount of relative movement between the edges of the automobile top, and these straps do not compensate for these movements. Further, the straps when used for a while, stretch, and considerable play is therefore produced. This causes the top to jerk or knock, in use.

My device is designed to take the place of this ordinary strap, and embodies the strap 10, which may be formed of any suitably flexible material, such as cloth, leather or the like. This strap is preferably in the form of a loop, the ends of which are adjustably connected by means of a buckle 11, or the like. At its top, the strap passes through a bracket 12, which is secured to the bow of the top 6.

The numeral 13 designates an inverted L-shaped bracket, having horizontal and vertical arms 14 and 15 respectively. The vertical arm 15 has an opening 16, for the reception of the bolt 8, and the bracket is clamped in place by the nut 9. The horizontal arm 14 is provided with a vertical opening 17, receiving a rod 18, provided at its upper end with an eye 19, preferably integral therewith. The rod 18 slides within the opening 17. The eye 19 receives the lower end of the strap 10, as shown.

The lower end of the rod 18 is screw threaded, for receiving a winged nut 20, and a cotter pin 21 is preferably passed through an opening in the rod 18, beneath the nut 20. A compressible coil spring 22 surrounds the bolt 18, between cup-shaped washers 23. The upper washer 23 engages the horizontal arm 14, while the lower washer 23 engages the nut 20. It is obvious that the tension of the spring 22 may be regulated by adjusting the nut 20.

As clearly shown in Fig. 1, the rod 18 is substantially vertical in use, and the spring 22 will serve to exert a yielding pull upon the strap 10.

It is to be understood that the form of my invention herewith shown and described is to be taken as a preferred example of the same, and that various changes in the shape, size, and arrangement of parts may be resorted to, without departing from the spirit of my invention, or the scope of the subjoined claims.

Having thus described my invention, I claim:

1. A device for connecting the wind shield post and top of an automobile, comprising an inverted approximately L-shaped bracket having substantially horizontal and vertical arms, said arms having openings formed therein, the opening in the vertical arm receiving the bolt of the wind shield post, an approximately vertical rod slidable within the opening in the horizontal arm, a nut having screw threaded engagement with the rod near its lower end, a coil spring carried by the rod and arranged between the nut and horizontal arm, a flexible strap connecting the upper end of the rod and automobile top, and means to adjust the length of the strap.

2. A device for connecting the wind shield post and top of an automobile, comprising a bracket having substantially vertical and horizontal portions, the vertical portion having an opening to receive the bolt of said post, the horizontal portion having an opening formed therein, an approximately vertical rod slidable within the opening of the horizontal portion and provided at its upper end with an eye, a nut screw threaded upon the lower end of the rod, a coil spring surrounding the rod between the horizontal portion and nut, and a strap engaging within the eye and secured to the top of the automobile.

3. The combination with the wind shield posts of an automobile, said posts having bolts extending outwardly and laterally at substantially a right angle to the longitudinal axis of the automobile, and the top of the automobile having its forward portion arranged near the wind shield posts, of inverted substantially L-shaped brackets arranged outwardly of and near said posts, each bracket embodying an upper substantially horizontal portion and a lower substantially vertical portion, the substantially vertical portion having a transverse opening to receive the bolt of the wind shield post and is adapted to be clamped upon said bolt, said vertical portion being arranged outwardly of and near the post and extending generally parallel therewith, while the upper horizontal portion projects laterally away from the posts generally parallel with said bolt, said upper horizontal portion having a substantially vertical opening, a substantially vertical rod slidable within the substantially vertical opening and extending above the same, a spring surrounding the rod beneath the substantially vertical portion to oppose its upward movement, and an element connecting the upper end of the rod with the adjacent portion of the top of the automobile.

In testimony whereof I affix my signature.

VIRGIL D. ROSS.